United States Patent
Tatsukawa (10) Patent No.: US 6,817,744 B2
(45) Date of Patent: Nov. 16, 2004

(54) VEHICLE LAMP

(75) Inventor: Masashi Tatsukawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/366,824

(22) Filed: Feb. 14, 2003

(65) Prior Publication Data

US 2003/0156420 A1 Aug. 21, 2003

(30) Foreign Application Priority Data

Feb. 18, 2002  (JP) ................................... P. 2002-039481

(51) Int. Cl.[7] ................................................ F21V 7/16
(52) U.S. Cl. ...................... 362/544; 362/518; 362/548
(58) Field of Search ................................. 362/518, 507, 362/517, 538, 346, 543, 544, 539, 548, 464, 465, 466, 549

(56) References Cited

U.S. PATENT DOCUMENTS

| | | | |
|---|---|---|---|
| 5,021,930 A | * 6/1991 | Yamada | 362/539 |
| 5,734,203 A | * 3/1998 | Slater | 307/10.8 |
| 5,954,428 A | * 9/1999 | Eichhorn et al. | 362/543 |
| 6,092,918 A | 7/2000 | Ikegami | |
| 6,120,169 A | 9/2000 | Sato | |
| 6,422,726 B1 | * 7/2002 | Tatsukawa et al. | 362/517 |
| 6,652,130 B2 | * 11/2003 | Mochizuki et al. | 362/517 |
| 2001/0028565 A1 | * 10/2001 | Ishida | 362/464 |

* cited by examiner

*Primary Examiner*—John Anthony Ward
*Assistant Examiner*—Hargobind S. Sawhney
(74) *Attorney, Agent, or Firm*—Fish & Richardson P.C.

(57) ABSTRACT

A first lamp unit and a second lamp unit are arranged in two vertically-spaced stages within a lamp chamber, which is formed by a lamp body and a light-transmitting cover, in such a manner that the second lamp unit is disposed over the first lamp unit. The second lamp unit is so constructed that at least part of reflected light from a reflector can pass through the light-transmitting cover disposed forwardly of the first lamp unit. The direction of radiation of the beam from the second lamp unit can point downward, so that the light can be directed toward a zone of the road near and ahead of the vehicle.

24 Claims, 10 Drawing Sheets

VEHICLE LAMP

BACKGROUND OF THE INVENTION

1. Field of the Invention

This invention relates to a vehicle lamp having a plurality of lamp units for radiating beams in different directions.

2. Description of the Related Art

A conventional vehicle lamp has a lamp unit such as a headlamp (hereinafter referred to as "first lamp unit") for radiating a beam toward a road surface ahead of a vehicle, as well as a lamp unit such as a bending lamp(hereinafter referred to as "second lamp unit") for radiating a beam toward a road surface obliquely ahead of the vehicle.

Generally, the second lamp unit is constructed to reflect light from a light source in a diffusive/deflective manner using a reflector.

The first lamp unit is configured to illuminate the road far ahead of the vehicle, while the second lamp unit is configured to illuminate the road close to the vehicle. Consequently, the second lamp unit is set to radiate in a more downward direction than the first lamp unit.

However, if the second lamp unit is set to a downward direction with a relatively large angle, the reflected light from the reflector radiates on a lower wall surface of this reflector and a lower wall surface of the lamp body. Therefore, the radiating beam, directed toward a zone of the road near and ahead of the vehicle, cannot be sufficiently attained.

SUMMARY OF THE INVENTION

The present invention provides a vehicle lamp in which a first lamp unit for radiating a beam toward a road surface ahead of a vehicle, as well as a second lamp unit for radiating a beam toward a road surface obliquely ahead of the vehicle, is received within a lamp chamber. The radiating beam from the second lamp unit, which is directed toward a zone of the road near and ahead of the vehicle, can be sufficiently attained.

In the present invention, the above object has been achieved by providing suitable arrangements of, for example, the location of a second lamp unit.

Further, according to the present invention, a first lamp unit for radiating a beam toward a road surface ahead of a vehicle, as well as a second lamp unit for radiating a beam toward a road surface obliquely ahead of the vehicle, is received within a lamp chamber formed by a lamp body and a light-transmitting cover.

The two lamp units are arranged in two vertically-spaced stages in such a manner that the second lamp unit is disposed in an upper position. The second lamp unit includes a light source, and a reflector for reflecting light from the light source in a diffusive/deflective manner. The second lamp unit is so constructed that at least part of the reflected light from the reflector passes through the light-transmitting portion of the cover disposed forwardly of the first lamp unit.

With respect to the lamp units of the above "vehicle lamp," only the first and second lamp units can be received within the lamp chamber, or other lamp unit(s) in addition to the first and second lamp units can be received within the lamp chamber.

The specific construction of "the first lamp unit" is not particularly limited, and the first lamp unit can be formed, for example, as a lamp unit (so-called paraboloid-type lamp unit), including a light source, and a reflector for reflecting light from this light source in a diffusive/deflective manner or as a lamp unit (so-called projector-type lamp unit) including a light source, a reflector for reflecting light from this light source in a condensing manner, and a projection lens disposed forwardly of this reflector.

The "second lamp unit" can be configured to light only when the first lamp unit is lit, or can be configured to light independently of the first lamp unit, or can be configured to light only in a predetermined condition such as just before and/or during turns, or can be configured to light always.

The phrase "to reflect the light in a diffusive/deflective manner" means reflecting light in a diffusive manner, a deflective manner, or a deflective and diffusive manner.

In the above embodiment, the first lamp unit for radiating a beam toward a road surface ahead of the vehicle, as well as the second lamp unit for radiating a beam toward a road surface obliquely ahead of the vehicle, is received within the lamp chamber formed by the lamp body and the light-transmitting cover. However, the two lamp units are arranged in two vertically-spaced stages so that that the second lamp unit is disposed in the upper position. The second lamp unit is configured so that at least part of the reflected light from the reflector passes through that portion of the light-transmitting cover disposed forwardly of the first lamp unit. Therefore, the direction of radiation of the beam from the second lamp unit can be set to a considerable downward direction.

Therefore, in the vehicle lamp of the present invention in which the first lamp unit for radiating a beam toward a road surface ahead of the vehicle, as well as the second lamp unit for radiating a beam toward a road surface obliquely ahead of the vehicle, is received within the lamp chamber, the radiating beam from the second lamp unit, which is directed toward a zone of the road near and ahead of the vehicle, can be sufficiently attained.

In the above embodiment, where the first lamp unit includes the light source, and the reflector for reflecting light from this light source in a diffusive/deflective manner, the construction of the vehicle lamp can be simplified by integrally forming the reflectors of the two lamp units.

In the above embodiment, where the optical axis of the second lamp unit is inclined outwardly in the direction of the width of the vehicle at a predetermined angle relative to a forward-rearward direction of the vehicle, the following operational effects can be obtained.

The second lamp unit is configured to radiate a beam toward a road surface obliquely ahead of the vehicle, and where this beam radiation is effected only by the diffusive/deflective control of the reflector, it is necessary to set the angle of horizontal deflection of the reflected light to a large value. Therefore, unevenness can develop in the luminous distribution pattern formed by the beam radiated toward the road surface obliquely ahead of the vehicle. Furthermore, the efficiency of the vehicle lamp may be degraded.

In this respect, where the optical axis of the second lamp unit is inclined outwardly in the direction of the width of the vehicle at the predetermined angle relative to the forward-rearward direction of the vehicle, it is not necessary to set the angle of horizontal deflection of the reflected light from the reflector to a large value. Therefore, unevenness is less likely to develop in the luminous distribution pattern formed by the beam radiated toward the road surface obliquely ahead of the vehicle. Further, the efficiency of the vehicle lamp can be enhanced.

In many cases, the vehicle lamp is mounted at a corner portion of a vehicle body, and an upper portion of this corner portion of the vehicle body is, in many cases, formed into a generally-rounded, curved shape. Where the optical axis of the second lamp unit is inclined outwardly in the direction of the width of the vehicle at the predetermined angle relative to the forward-rearward direction of the vehicle, the second lamp unit can be easily arranged in conformity with the curved shape of the corner portion of the vehicle body.

Here, although "the predetermined angle" is not particularly limited to any specific value, it can be set to the range of between 10° and 60°, preferably to the range of between 20° and 50°, and more preferably to the range of between 30° and 40°.

The specific construction of the above "second lamp unit" is not particularly limited, but where the second lamp unit is formed as a bending lamp for illuminating a road surface ahead in a turning direction when the vehicle turns or is about to turn (blinkers on), a zone of the road near and ahead in the turning direction can be sufficiently illuminated by the beam from the second lamp unit. Thus, the visibility for this near zone can be enhanced, thereby promoting safety even just before and during turns.

DETAILED DESCRIPTION OF THE PREFERRED EMBODIMENTS

A preferred embodiment of the present invention will now be described with reference to the drawings.

Figure 1:
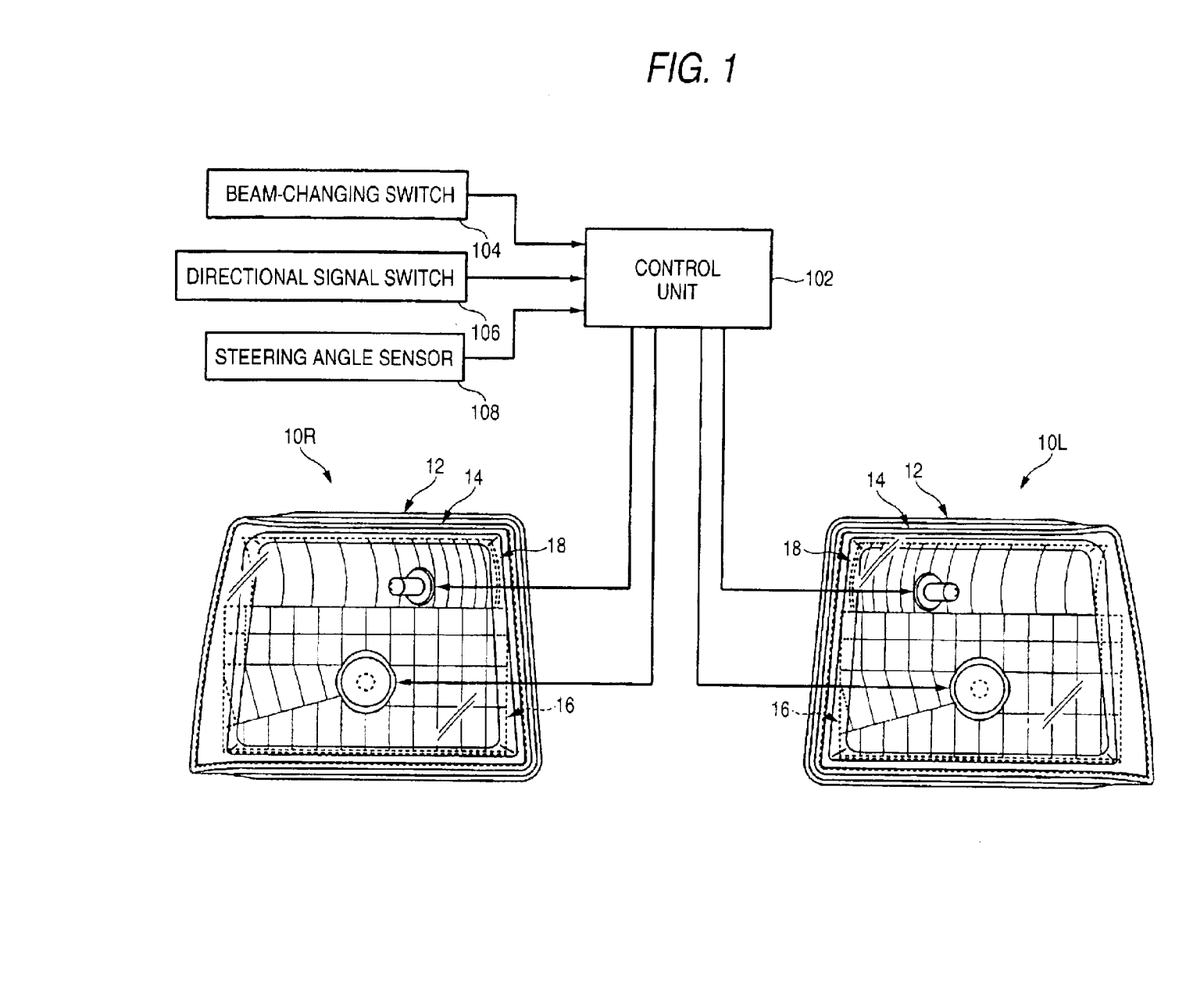
FIG. 1 is a front-elevational view showing one preferred embodiment of a pair of left and right vehicle lamps of the present invention as well as a control system thereof.

FIG. 1 is a front-elevational view showing one preferred embodiment of vehicle lamps of the invention as well as a control system thereof.

As shown in the drawings, the vehicle lamps 10L and 10R of this embodiment are adapted to mount respectively on left and right corner portions of a front end of a vehicle. A beam radiation control in a vehicle-running condition can be effected on the basis of detected signals from a beam changing switch 104, a directional signal switch 106 and a steering angle sensor 108 under the control of a control unit 102.

The two vehicle lamps 10L and 10R are similar in construction, and therefore, only the left vehicle lamp 10L will be described hereinafter.

Figure 2:
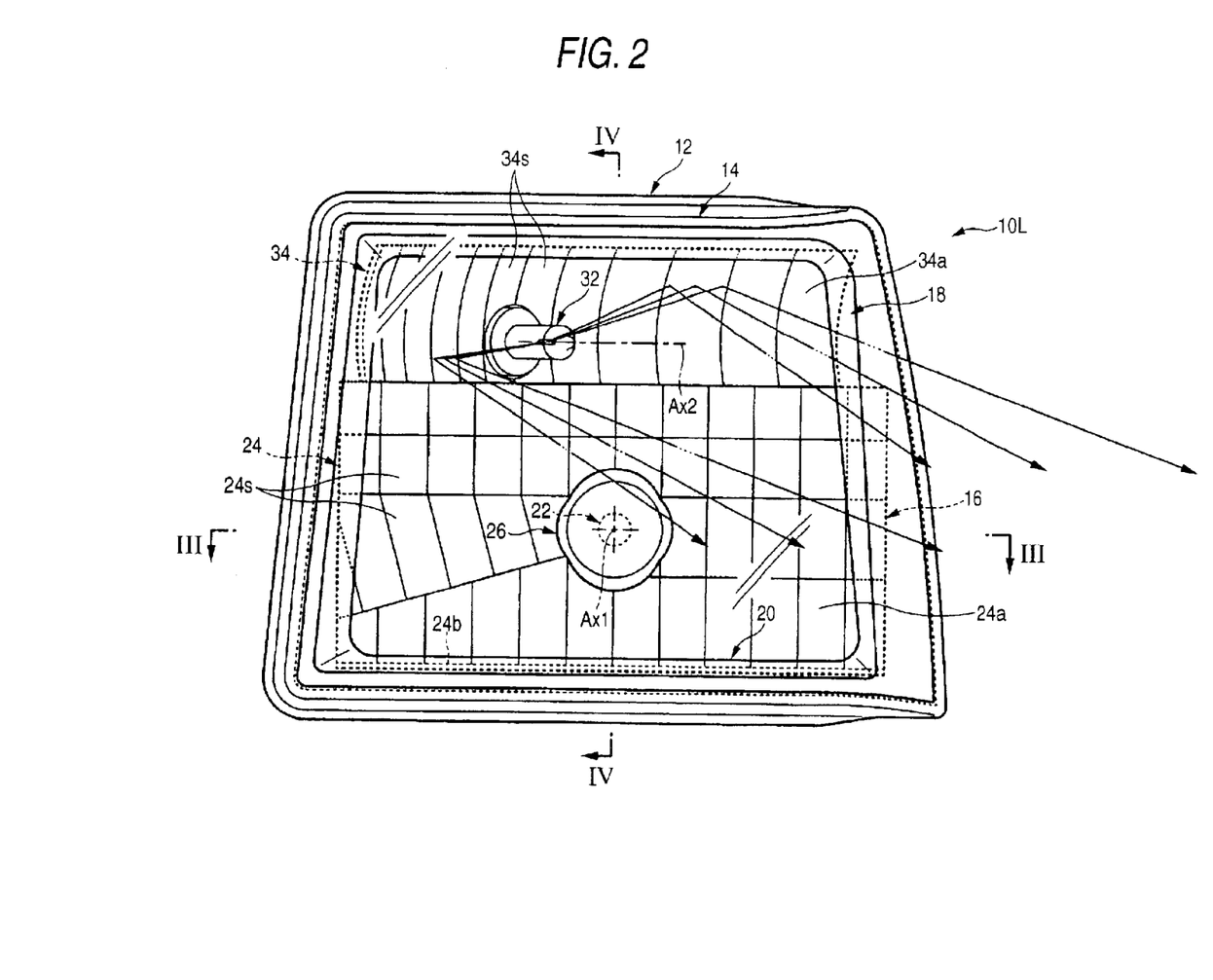
FIG. 2 is a front-elevational view showing the left vehicle lamp.
Figure 3:
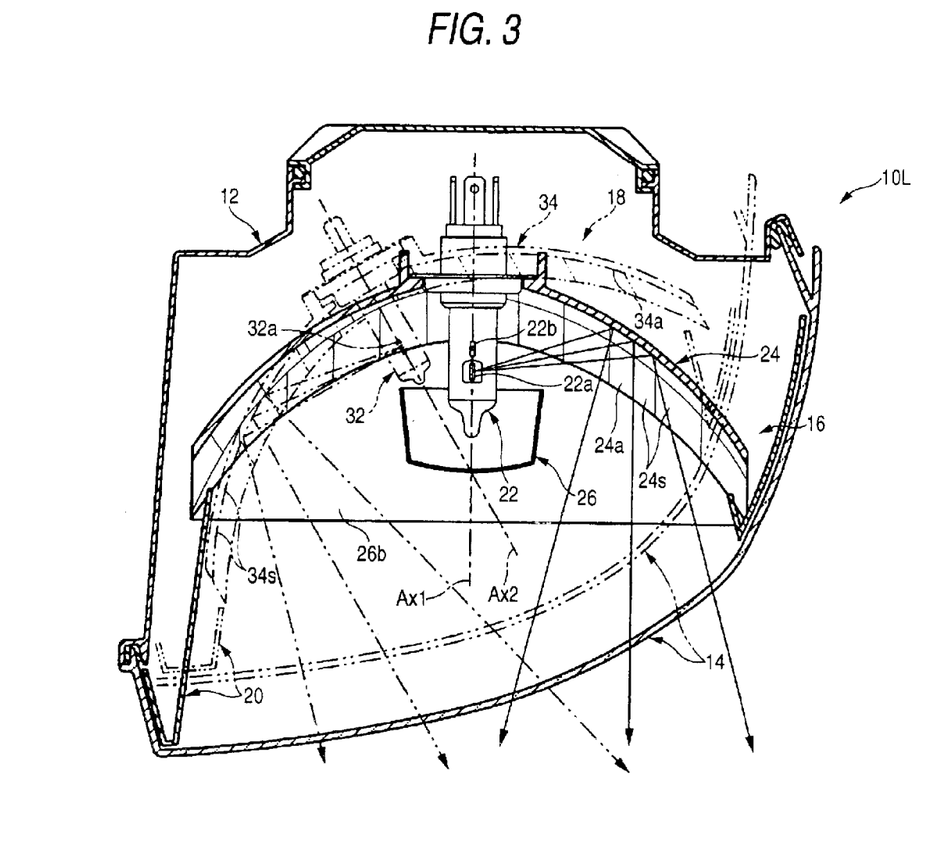
FIG. 3 is a cross-sectional views taken along the line III—III of FIG. 2.
Figure 4:
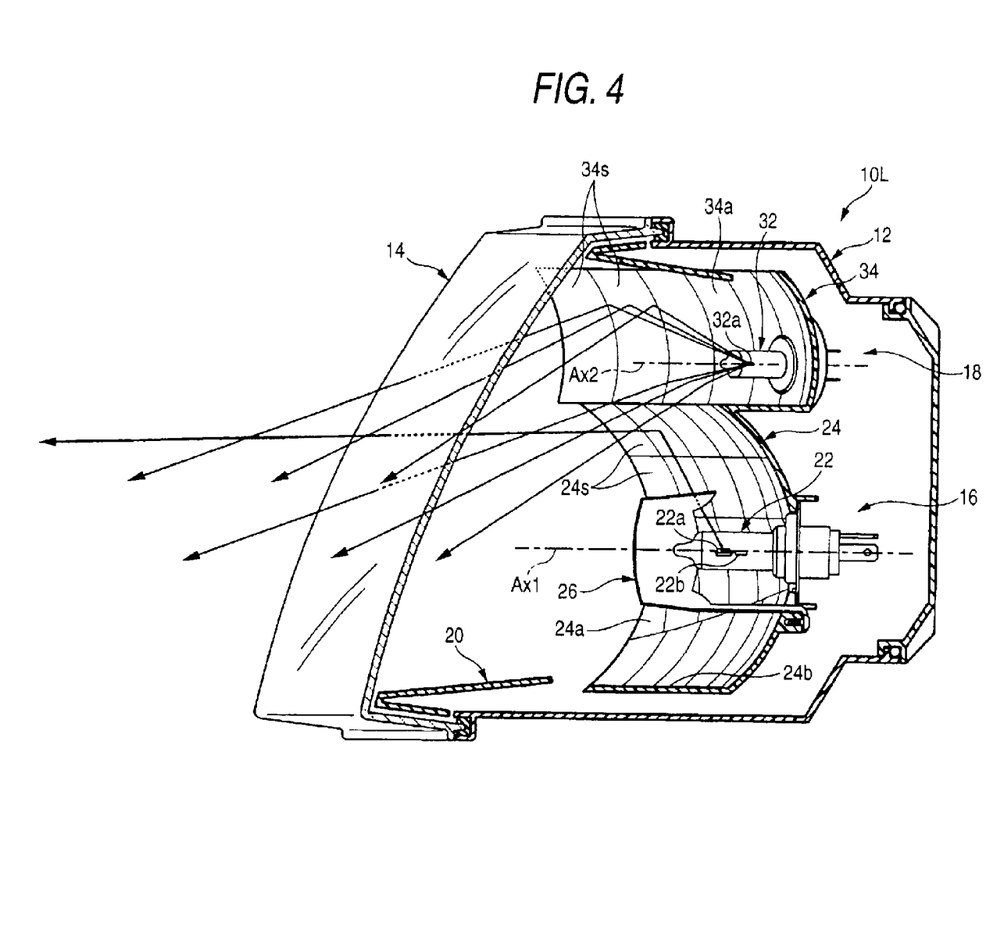
FIG. 4 is a cross-sectional view taken along the line IV—IV of FIG. 2.

FIG. 2 is a front-elevational view showing the vehicle lamp 10L, and FIGS. 3 and 4 are cross-sectional views taken along the lines III—III and IV—IV of FIG. 2, respectively.

As shown in these figures, a first lamp unit 16 and a second lamp unit 18 of the vehicle lamp 10L are disposed within a lamp chamber formed by a lamp body 12 and a transparent light-transmitting cover 14. The two lamp units 16 and 18 are arranged in two vertically-spaced stages so that the second lamp unit 18 is disposed in an upper position. An extension reflector 20 is provided between the two lamp units 16 and 18 and the light-transmitting cover 14.

The first lamp unit 16 is formed as a headlamp for radiating a beam toward a road surface ahead of the vehicle, and includes a light source bulb (H4 halogen bulb) 22, a reflector 24, and a shade 26.

The reflector 24 has a reflecting surface 24a which is defined by a paraboloid having its center axis coinciding with an optical axis Ax1 extending in a forward-rearward direction of the vehicle. A plurality of reflecting elements 24s are formed on this reflecting surface 24a. Light from a low-beam filament 22a (light source) of the light source bulb 22, as well as light from a high-beam filament 22b (light source) of the bulb 22, is reflected forwardly in a diffusive/deflective manner by the reflecting surface 24a.

On the other hand, the second lamp unit 18 is formed as a bending lamp for radiating a beam toward a road surface obliquely ahead of the vehicle, and includes a light source bulb (H7 halogen bulb) 32, and a reflector 34.

The reflector 34 has a reflecting surface 34a which is defined by a paraboloid having its center axis coinciding with an optical axis Ax2 extending in a direction inclined outwardly (left) in the direction of the width of the vehicle at a predetermined angle (about 30 degrees) relative to the forward-rearward direction of the vehicle. A plurality of reflecting elements 34s are formed on this reflecting surface 34a. Light from a filament 32a (light source) of the light source bulb 32 is reflected obliquely, forwardly, and downwardly in a diffusive/deflective manner by the reflecting surface 34a.

The reflectors 24 and 34 of the two lamp units 16 and 18 are formed integrally with each other, using a unitary member, and are supported on the lamp body 12 through an aiming mechanism (not shown) for tilting in the right, left, upward, or downward direction. A wall surface portion 24b is formed at a lower side of the reflecting surface 24a of the reflector 24, but no wall surface portion is formed at an upper side of the reflecting surface 34a of the reflector 34, and also no wall surface portion is formed at the boundary between the two reflecting surfaces 24a and 34a. The extension reflector 20 is provided in relation to outer peripheral edge portions of the two reflectors 24 and 34.

As shown in FIGS. 2 and 4, light from the filament 32a of the light source bulb 32 is deflected downwardly and diffused horizontally by the reflecting surface 34a of the reflector 34 of the second lamp unit 18. At this time, part of the reflected light from the reflecting surface 34a of the reflector 34 passes through that portion of the light-transmitting cover 14 disposed in front of the first lamp unit 16 (that is, disposed forwardly of the reflecting surface 24a of the reflector 24) since no wall surface portion is formed at the boundary between the reflecting surfaces 24a and 34a of the two reflectors 24 and 34.

As shown in FIG. 1, the first lamp unit 16 of the right vehicle lamp 10R is constructed to move in parallel with the first lamp unit 16 of the left vehicle lamp 10L, and the second lamp unit 18 of the right vehicle lamp 10R is constructed to move in anti-parallel with the second lamp unit 18 of the left vehicle lamp 10L in a right-left direction.

Figure 5A:
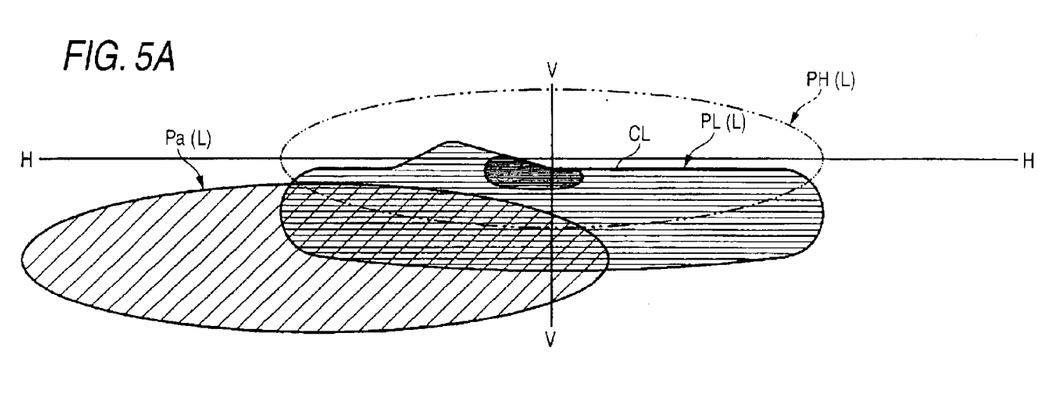
FIG. 5A is a view showing a luminous distribution pattern formed on an imaginary vertical screen, forwardly spaced a distance of 25 m from the vehicle lamp, by beams radiated respectively from lamp units of the left vehicle lamp.

FIG. 5A is a view showing a luminous distribution pattern formed on an imaginary vertical screen, forwardly spaced a distance of 25 m from the vehicle lamp, by beams radiating respectively from the lamp units 16 and 18 of the left vehicle lamp 10L.

As shown in this Figure, the first lamp unit 16 forms a low-beam luminous distribution pattern PL (L) for left luminous distribution, having a cut-off line CL, when the low-beam filament 22a of the light source bulb 22 is lit. When the high-beam filament 22b of the light source bulb 22 is lit, a high-beam luminous distribution pattern PH (L) is formed as indicated in a dots-and-dash line.

On the other hand, the second lamp unit 18 forms an auxiliary luminous distribution pattern Pa (L) disposed at the lower left of the low-beam luminous distribution pattern PL (L) in overlapping relation thereto.

Figure 5B:
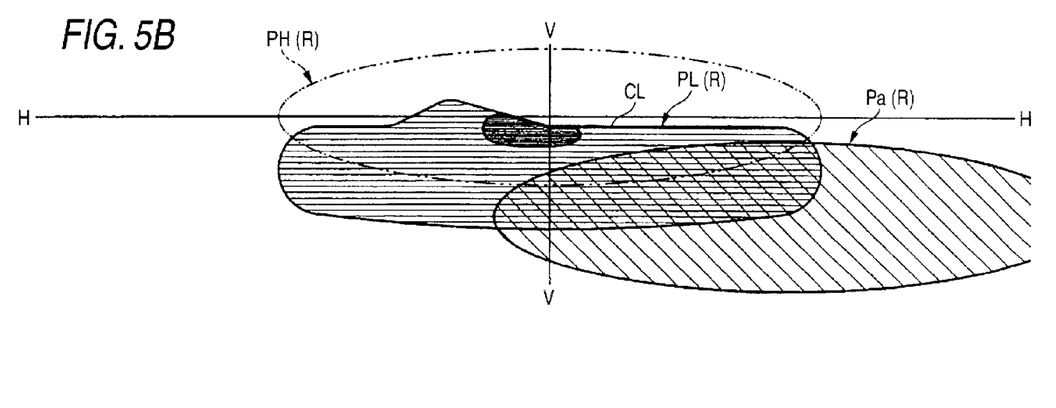
FIG. 5B is a similar view, but showing a luminous distribution pattern formed by the right vehicle lamp.

FIG. 5B is a view showing a luminous distribution pattern formed on an imaginary vertical screen, forwardly spaced a distance of 25 m from the vehicle lamp, by beams radiating respectively from the lamp units 16 and 18 of the right vehicle lamp 10R.

As shown in this figure, a low-beam luminous distribution pattern PL (R) and a high-beam luminous distribution pattern PH (R), formed by beams radiating from the first lamp unit 16, are similar to those formed by the left vehicle lamp 10L, but an auxiliary luminous distribution pattern Pa (R), formed by a beam radiating from the second lamp unit 18, is disposed at the lower right of the low-beam luminous distribution pattern PL (R) in overlapping relation thereto.

When the first lamp unit 16 of the left vehicle lamp 10L is lit in the low-beam radiating mode, the second lamp unit 18 of this vehicle lamp 10L is lit if the vehicle turns left. On the other hand, when the first lamp unit 16 of the right vehicle lamp 10R is lit in the low-beam radiating mode, the second lamp unit 18 of this vehicle lamp 10R is lit if the vehicle turns right.

When the control unit 102 detects an input signal from the steering sensor 108, or when the control unit 102 detects an input (blinking) signal from the directional signal switch 106 (that is, detects the fact that the directional signal has been operated), the control unit 102 causes the second lamp unit 18 of the vehicle lamp 10L or 10R, corresponding to the vehicle-turning direction, to be lit.

Figure 6:
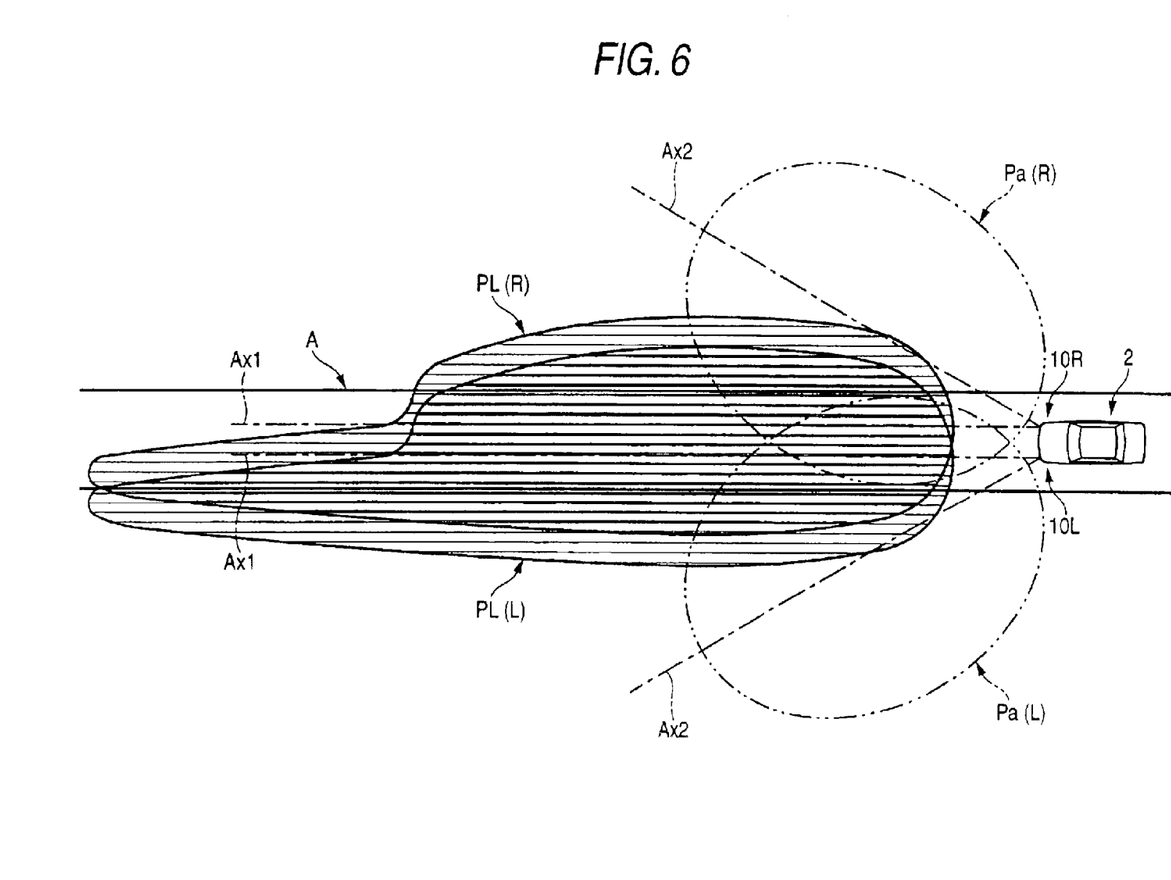
FIG. 6 is a plan view showing an example of beam radiation control of the two vehicle lamps.
Figure 7:
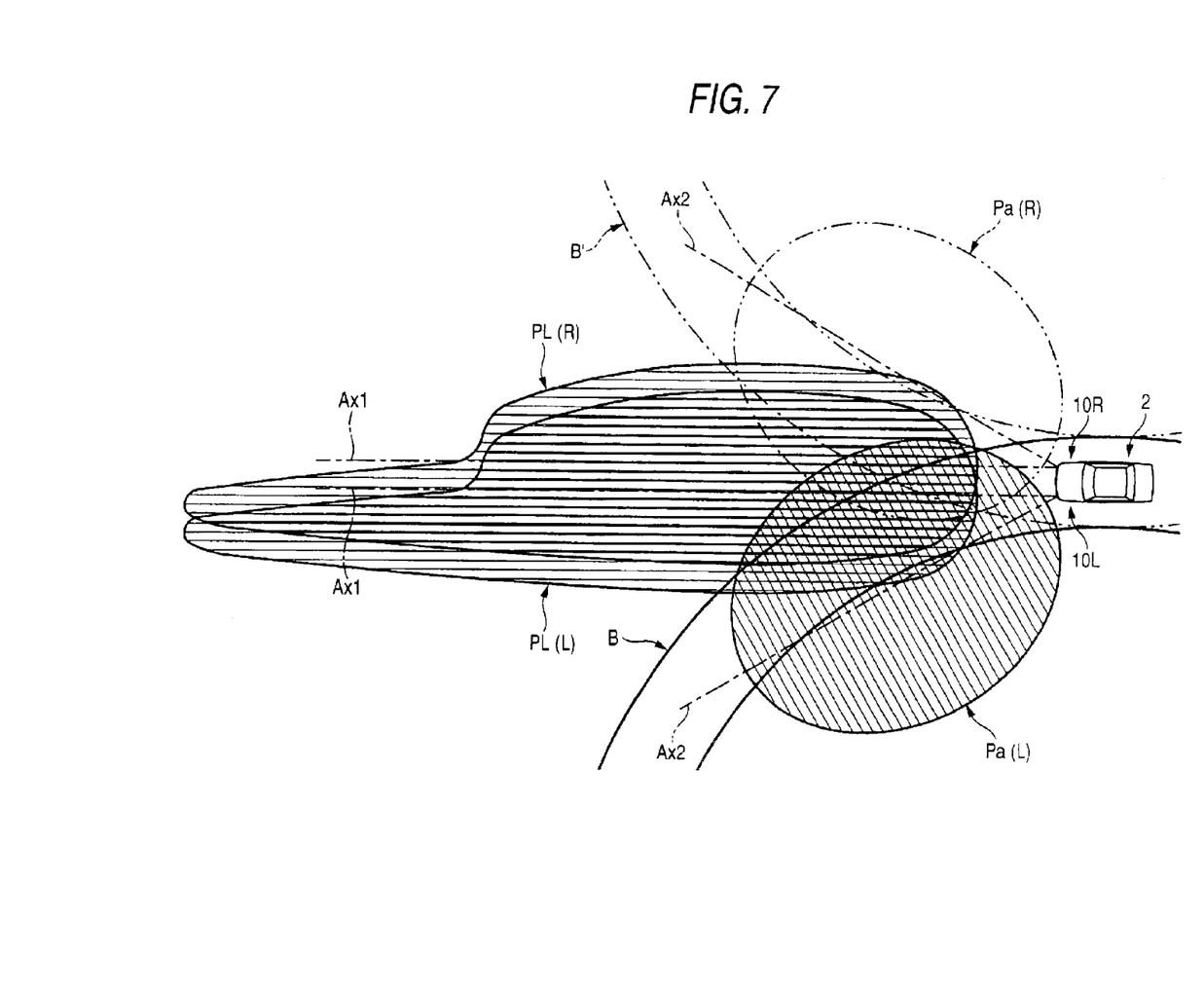
FIG. 7 is a plan view showing an example of beam radiation control of the two vehicle lamps.
Figure 8:
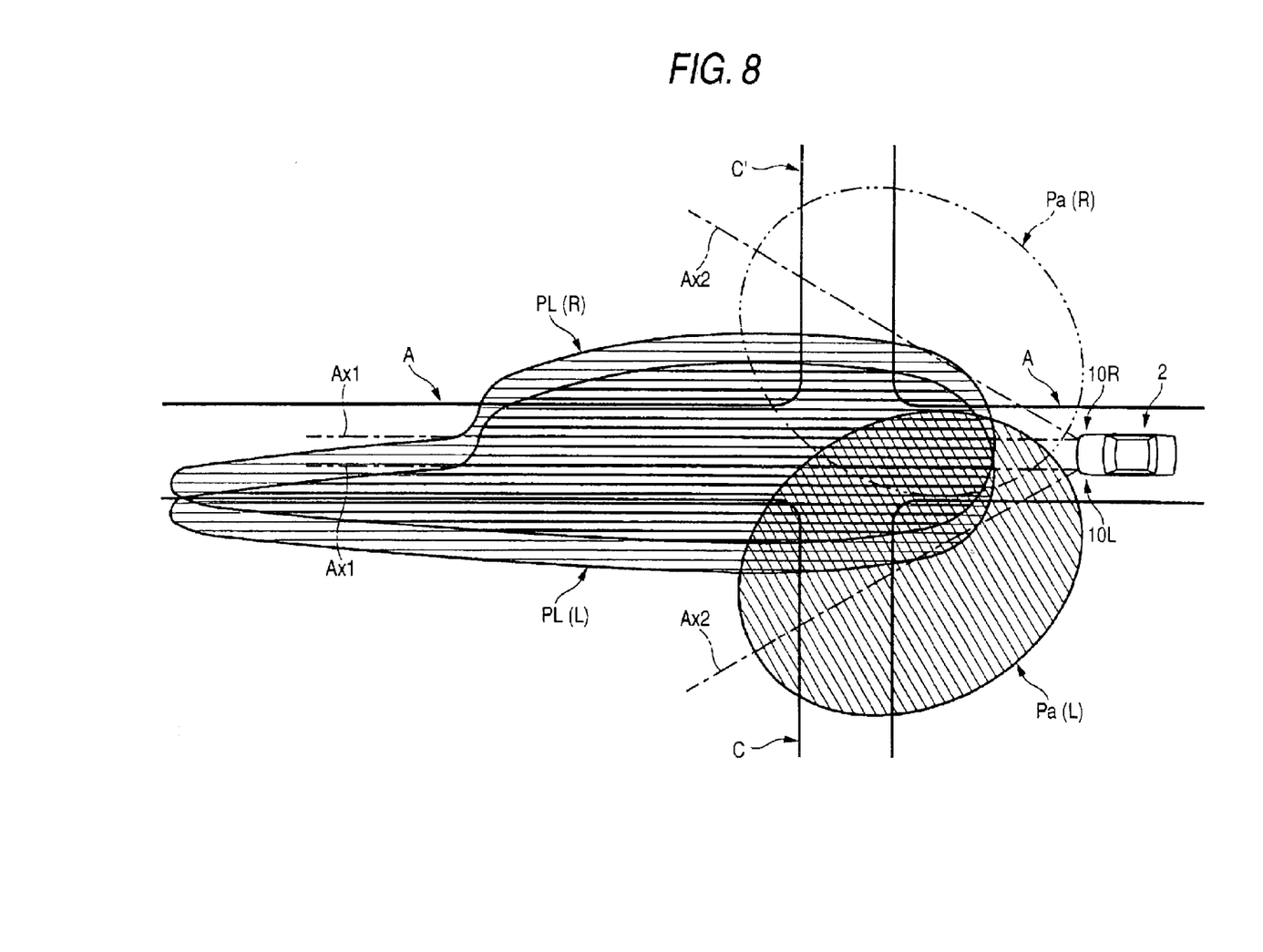
FIG. 8 is a plan view showing an example of beam radiation control of the two vehicle lamps.

FIGS. 6, 7 and 8 are plan views showing examples of beam radiation control for the two vehicle lamps 10L and 10R by the control unit 102.

When the vehicle 2 is running straight on road A as shown in FIG. 6, the second lamp units 18 of the two vehicle lamps 10L and 10R are not lit, and only the first lamp units 16 are lit to effect the beam radiation in the low-beam luminous distribution patterns PL (L) and PL (R).

When the vehicle 2 turns to a left-curving road B as shown in FIG. 7, the steering operation for the left direction has been effected, and therefore, the second lamp unit 18 of the left vehicle lamp 10L is additionally lit. Thus, the beam radiation is effected in the low-beam luminous distribution patterns PL (L) and PL (R) and the auxiliary luminous distribution pattern Pa (L), and a road surface of the left-curving travel road B ahead in the advancing direction is sufficiently illuminated over the range from a far zone to an intermediate-distance zone.

When the vehicle 2 turns to a right-curving road B' as shown in FIG. 7, the steering operation for the right direction has been effected, and therefore, the second lamp unit 18 of the right vehicle lamp 10R is additionally lit, so that the beam radiation is effected in the low-beam luminous distribution patterns PL (L) and PL (R) and the auxiliary luminous distribution pattern Pa (R), and a road surface of the left-curving travel road B' ahead in the advancing direction is sufficiently illuminated over the range from a far zone to an intermediate-distance zone.

When the blinking operation for turning left is effected during the travel of the vehicle 2 on the straight road A as shown in FIG. 8, the second lamp unit 18 of the left vehicle lamp 10L is additionally lit, so that the beam radiation is effected in the low-beam luminous distribution patterns PL (L) and PL (R) and the auxiliary luminous distribution pattern Pa (L), and a road surface of a left-turned travel road C ahead in the advancing direction is sufficiently illuminated.

When the blinking operation for turning right is effected during the travel of the vehicle 2 on the straight road A, the second lamp unit 18 of the right vehicle lamp 10R is additionally lit, so that the beam radiation is effected in the low-beam luminous distribution patterns PL (L) and PL (R) and the auxiliary luminous distribution pattern Pa (R) as indicated by a dots-and-dash line in FIG. 8, and a road surface of a right-turned travel road C' ahead in the advancing direction is sufficiently illuminated.

As described above in detail, in each of the vehicle lamps 10L and 10R of this embodiment, the first lamp unit 16 for radiating a beam toward a road surface ahead of the vehicle, and the second lamp unit 18 for radiating a beam toward a road surface obliquely ahead of the vehicle are received within the lamp chamber formed by the lamp body 12 and the light-transmitting cover 14. The two lamp units 16 and 18 are arranged in two vertically-spaced stages in such a manner that the second lamp unit 18 is disposed in the upper position. The second lamp unit 18 is constructed to pass a part of the reflected light from the reflector 34 through that portion of the light-transmitting cover 14 disposed forwardly of the first lamp unit 16. Therefore, the direction of radiation of the beam from the second lamp unit 18 can be set to a considerable downward direction. Thus, in this embodiment, the radiating beam from the second lamp unit 18, which is directed toward a zone of the road near and ahead of the vehicle, can be sufficiently attained.

In each of the vehicle lamps 10L and 10R of this embodiment, although each of the first and second lamp units 16 and 18 is formed as a paraboloid-type lamp unit, the reflectors 24 and 34 of the two lamp units 16 and 18 are formed integrally with each other, and therefore, the construction of the vehicle lamps is simplified.

Further, in each of the vehicle lamps 10L and 10R of this embodiment, the optical axis Ax2 of the second lamp unit 18 is inclined outwardly in the direction of the width of the vehicle at a predetermined angle relative to the forward-rearward direction of the vehicle. Therefore, it is not necessary to set the angle of horizontal deflection of the reflected light from the reflector 34 to a large value so that the beam can be radiated toward a road surface obliquely ahead of the vehicle. Any large step portion is prevented from being formed at the reflecting elements 34s, jointly forming the reflecting surface 34a of the reflector 34, so that unevenness is less likely to develop in the luminous distribution pattern formed by the beam radiated toward the road surface obliquely ahead of the vehicle. Moreover, the efficiency of the vehicle lamp can be enhanced. Because the optical axis Ax2 of the second lamp unit 18 is inclined outwardly in the direction of the width of the vehicle at the predetermined angle relative to the forward-rearward direction of the vehicle, the second lamp unit 18 can be easily disposed in conformity with the curved shape of the corner portion of the vehicle body.

In each of the vehicle lamps 10L and 10R of this embodiment, the second lamp unit 18 is formed as a bending lamp for illuminating a road surface ahead in the turning direction when the vehicle turns or just about to turn. Therefore, the zone of the road near and ahead in the turning direction can be sufficiently illuminated by the beam from the second lamp unit 18, so that the visibility for this near zone can be enhanced, thereby enhancing safety before and during turns.

The second lamp unit 18 of each of the vehicle lamps 10L and 10R can be lit not only when the vehicle turns but also when the vehicle runs straight at low speed, and by doing so, the visibility for a road surface ahead of the vehicle can be further enhanced.

In this embodiment, when the first lamp unit 16 of each of the vehicle lamps 10L and 10R is lit in the low-beam radiating mode, the second lamp unit 18 of the vehicle lamp 10L or the vehicle lamp 10R is also lit if the vehicle turns. However, each vehicle lamp can be so constructed that when the first lamp unit 16 of each of the vehicle lamps 10L and 10R is lit in the high-beam radiating mode, the second lamp unit 18 of the vehicle lamp 10L or the vehicle lamp 10R also can be lit if the vehicle turns.

In this embodiment described above, although the first lamp unit 16 of each of the vehicle lamps 10L and 10R is formed in a paraboloid shape, the first lamp unit 16 can be formed in other shapes such as a projector shape.

Figure 9:
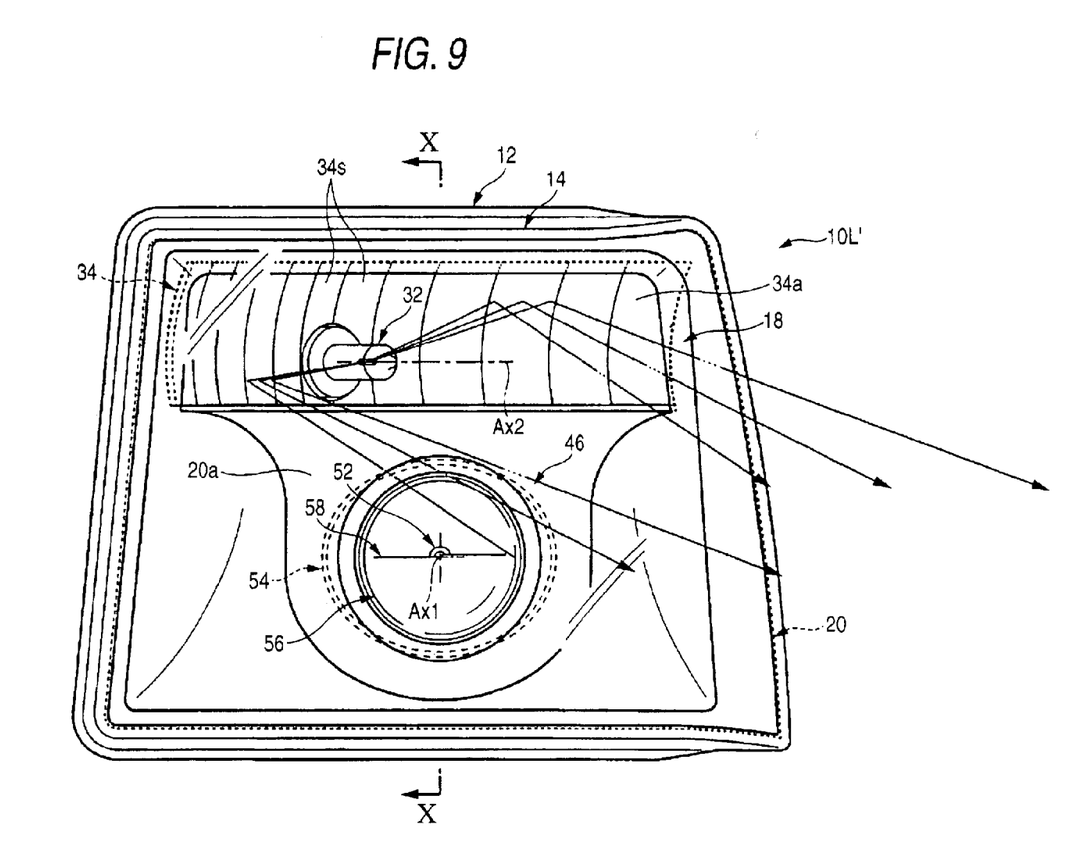
FIG. 9 is a front-elevational view of a modified example of the left vehicle lamp of the above embodiment.
Figure 10:
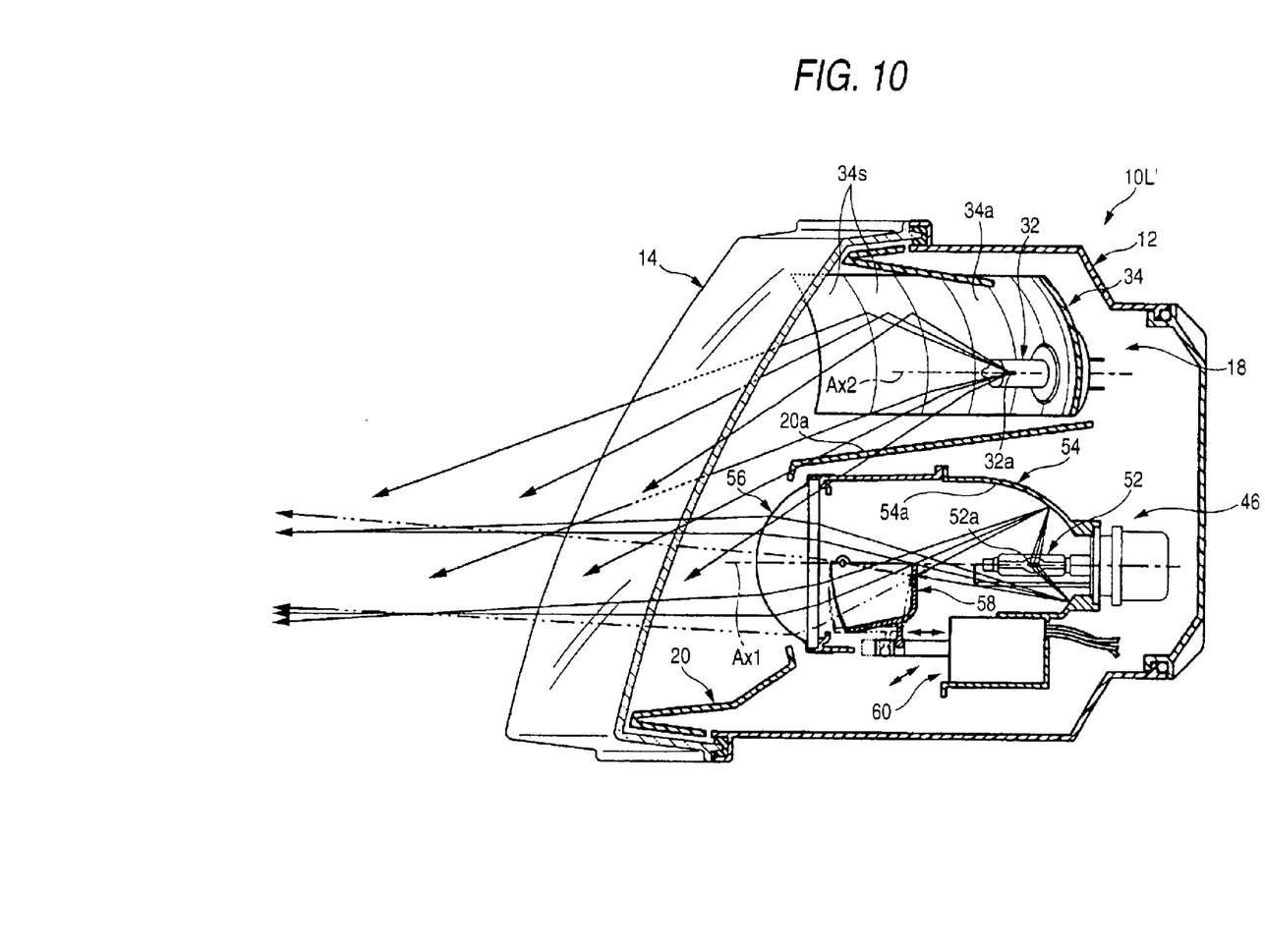
FIG. 10 is a cross-sectional view taken along the line X—X of FIG. 9.

FIG. 9 is a front-elevational view showing a left vehicle lamp 10L' having a first lamp unit 46 formed as a projector-type lamp unit, and FIG. 10 is a cross-sectional view taken along the line X—X of FIG. 9.

As shown in these figures, the first lamp unit 46 of the vehicle lamp 10L' includes a light source bulb (discharge bulb) 52, a reflector 54 of a generally ellipsoid shape for reflecting light from a discharge light-emitting portion 52a (light source) of the discharge bulb 52 in a condensing manner, a projection lens 56 provided forwardly of the reflector 54, a shade 58 provided between the projection lens 56 and the reflector 54, and a shade driving device 60 for angularly moving the shade 58 forward and rearward.

In this embodiment, an optical axis of a first lamp unit of a right vehicle lamp is in parallel with the optical axis of the first lamp unit 46 of the left vehicle lamp 10L', and an optical axis of a second lamp unit of the right vehicle lamp is in anti-parallel (specifically, symmetric) with the optical axis of the second lamp unit 18 of the left vehicle lamp 10L' in a right-left direction.

In the first lamp unit 46, when the shade 58 is located in an illustrated position indicated in solid lines, a part of the reflected light from the reflector 54 is intercepted by the shade 58, thereby eliminating an upwardly-directed radiation beam sent out from the first lamp unit 46. Thus, a low-beam radiation beam (i.e., a beam indicated in solid lines in FIG. 10), directed downwardly relative to an optical axis Ax1, is attained. On the other hand, when the shade 58 is moved into a position indicated in dots-and-dash lines in this figure, the shade 58 ceases to intercept the reflected light from the reflector 54, thereby also allowing the upwardly-directed radiation light to go out of the first lamp unit 46.

Thus, a high-beam radiation beam (i.e., a beam indicated by solid lines and dots-and-dash lines in FIG. 10) is attained.

In this vehicle lamp 10L', the reflector 54 of the first lamp unit 46 is quite different in shape from a reflector 34 of the second lamp unit 18. Therefore, the two reflectors 54 and 34 are separate from each other. A projection lens-surrounding portion 20a of a generally tubular shape, which surrounds the projection lens 56, is formed on and extends from an extension reflector 20.

In this vehicle lamp 10L', the second lamp unit 18 is constructed such that part of the reflected light from the reflector 34 passes through that portion of a light-transmitting cover 14 disposed forwardly of the first lamp unit 46. Therefore, the direction of radiation of the beam from the second lamp unit 18 can be set to a considerable downward direction. Consequently, the radiating beam from the second lamp unit 18, which is directed toward a zone of the road near and ahead of the vehicle, can be sufficiently attained.

In the above embodiment and the modified example thereof, although the first lamp unit 16, 46, is configured to radiate the low beam and high beam, the first lamp unit 16, 46 also can be configured to radiate only the low beam, in which case there is provided another lamp unit for radiating a high beam.

The present invention claims priority from Japanese patent application serial no. 2002-039481 filed on Feb. 18, 2002, which is incorporated by reference herein in its entirety.

Several embodiments of the invention have been described herein, but it should be understood that various additions and modifications could be made which fall within the scope of the following claims.

What is claimed is:

1. A vehicle lamp comprising:

a first lamp unit for radiating a beam toward a road surface ahead of a vehicle;

a second lamp unit for radiating a beam toward a road surface obliquely ahead of the vehicle, said first and second lamp units being disposed vertically, and said second lamp unit being disposed above said first lamp unit;

a lamp chamber formed by a lamp body and a light-transmitting cover, for receiving said first and second lamp units;

wherein said second lamp unit comprises a light source, a reflector for reflecting light from said light source in at least one of a diffusive manner and a deflective manner, said reflector configured to direct at least part of the reflected light to pass through said light-transmitting cover disposed forwardly of said first lamp unit, wherein an optical axis of said second lamp unit is inclined outwardly in a direction of a width of the vehicle at a predetermined angle relative to a forward-rearward direction of the vehicle.

2. The vehicle lamp according to claim 1, wherein said first lamp unit comprises a light source, and a reflector for reflecting light from said light source in at least one of a diffusive manner and a deflective manner; and said reflectors of said first and second lamp units are integrally formed.

3. The vehicle lamp according to claim 1, wherein said first lamp unit comprises a light source, a reflector for reflecting light from said light source in a condensing manner, and a projection lens disposed forwardly of said reflector.

4. The vehicle lamp according to claim 1, wherein said second lamp unit is formed as a bending lamp for illuminating a road surface ahead in a turning direction.

5. The vehicle lamp according to claim 1, wherein the second lamp unit is always on.

6. The vehicle lamp according to claim 1, wherein said second lamp unit is configured to turn on when the vehicle begins or just before begins to turn.

7. The vehicle lamp according to claim 1, wherein the second lamp unit turns on when a turning signal is turned on.

8. The vehicle lamp according to claim 1, wherein the second lamp unit is configured such that when a right turn signal is turned on, the second lamp unit disposed at a right front corner of the vehicle turns on, when the a left turn signal is turned on, the second lamp unit disposed at a left front corner of the vehicle turns on.

9. The vehicle lamp according to claim 1, wherein the first lamp unit and the second lamp unit are disposed each at a right front corner and a left front corner of the vehicle.

10. The vehicle lamp according to claim 9, wherein the right front corner first lamp unit and the left front corner first lamp unit move in parallel in the direction of a vehicular turn.

11. The vehicle lamp according to claim 9, wherein the right front corner second lamp unit and the left front corner second lamp unit move in anti-parallel in left-right directions during a vehicular turn.

12. A vehicle lamp comprising:

a first lamp unit for radiating a beam toward a road surface ahead of a vehicle;

a second lamp unit for radiating a beam toward a road surface obliquely ahead of the vehicle, said second lamp unit being disposed above said first lamp unit;

wherein said second lamp unit comprises a light source, a reflector for reflecting light from said light source in at least one of a diffusive manner and a deflective manner; a lamp chamber for receiving the first and second lamps; said reflector configured to direct at least part of the reflected light to pass through a light-transmitting cover disposed forwardly of said first lamp unit; and said second lamp unit is configured to turn on when the vehicle begins or just before begins to turns, wherein an optical axis of said second lamp unit is inclined outwardly in a direction of a width of the vehicle at a predetermined angle relative to a forward-rearward direction of the vehicle.

13. The vehicle lamp according to claim 12, wherein the second lamp unit turns on when a turning signal is turned on.

14. The vehicle lamp according to claim 12, wherein the second lamp unit is configured such that when a right turn signal is turned on, the second lamp unit disposed at a right front corner of the vehicle turns on, when the a left turn signal is turned on, the second lamp unit disposed at a left front corner of the vehicle turns on.

15. A vehicle lamp comprising:

a first lamp unit for radiating a beam toward a road surface ahead of a vehicle;

a second lamp unit for radiating a beam toward a road surface obliquely ahead of the vehicle, said first and second lamp units being disposed vertically, and said second lamp unit being disposed above said first lamp unit;

a lamp chamber formed by a lamp body and a light-transmitting cover, for receiving said first and second lamp units;

wherein said second lamp unit comprises a light source, a reflector for reflecting light from said light source in at least one of a diffusive manner and a deflective manner, said reflector configured to direct at least part of the reflected light to pass through said light-transmitting cover disposed forwardly of said first lamp unit, wherein said second lamp unit is formed as a bending lamp for illuminating a road surface ahead in a turning direction.

16. The vehicle lamp according to claim 15, wherein said first lamp unit comprises a light source, and a reflector for reflecting light from said light source in at least one of a diffusive manner and a deflective manner; and said reflectors of said first and second lamp units are integrally formed.

17. The vehicle lamp according to claim 15, wherein said first lamp unit comprises a light source, a reflector for reflecting light from said light source in a condensing manner, and a projection lens disposed forwardly of said reflector.

18. The vehicle lamp according to claim 15, wherein the second lamp unit is always on.

19. The vehicle lamp according to claim 15, wherein said second lamp unit is configured to turn on when the vehicle begins or just before begins to turn.

20. The vehicle lamp according to claim 15, wherein the second lamp unit turns on when a turning signal is turned on.

21. The vehicle lamp according to claim 15, wherein the second lamp unit is configured such that when a right turn signal is turned on, the second lamp unit disposed at a right front corner of the vehicle turns on, when the a left turn signal is turned on, the second lamp unit disposed at a left front corner of the vehicle turns on.

22. A vehicle lamp comprising:

a first lamp unit for radiating a beam toward a road surface ahead of a vehicle;

a second lamp unit for radiating a beam toward a road surface obliquely ahead of the vehicle, said second lamp unit being disposed above said first lamp unit;

wherein said second lamp unit comprises a light source, a reflector for reflecting light from said light source in at least one of a diffusive manner a lamp chamber for receiving the first and second lamps; and a deflective manner; a lamp chamber for receiving the first and second lamps; said reflector configured to direct at least part of the reflected light to pass through a light-transmitting cover disposed forwardly of said first lamp unit; and said second lamp unit is configured to turn on when the vehicle begins or just before begins to turn, wherein said second lamp unit is formed as a bending lamp for illuminating a road surface ahead in a turning direction.

23. The vehicle lamp according to claim 22, wherein the second lamp unit turns on when a turning signal is turned on.

24. The vehicle lamp according to claim 23, wherein the second lamp unit is configured such that when a right turn signal is turned on, the second lamp unit disposed at a right front corner of the vehicle turns on, when the a left turn signal is turned on, the second lamp unit disposed at a left front corner of the vehicle turns on.

* * * * *